(12) United States Patent
Hallivuori et al.

(10) Patent No.: US 10,237,117 B2
(45) Date of Patent: Mar. 19, 2019

(54) CONFIGURATION SYSTEM FOR CONFIGURING THE CONTROL-PLANE OF A SOFTWARE-DEFINED NETWORK

(71) Applicant: CORIANT OY, Espoo (FI)

(72) Inventors: Ville Hallivuori, Espoo (FI); Juhamatti Kuusisaari, Helsinki (FI); Sami Finer, Espoo (FI)

(73) Assignee: CORIANT OY, Espoo (FI)

( * ) Notice: Subject to any disclaimer, the term of this patent is extended or adjusted under 35 U.S.C. 154(b) by 0 days.

(21) Appl. No.: 15/564,911

(22) PCT Filed: Apr. 17, 2015

(86) PCT No.: PCT/FI2015/050265
§ 371 (c)(1),
(2) Date: Oct. 6, 2017

(87) PCT Pub. No.: WO2016/166403
PCT Pub. Date: Oct. 20, 2016

(65) Prior Publication Data
US 2018/0102968 A1    Apr. 12, 2018

(51) Int. Cl.
*H04L 12/24*    (2006.01)
*H04L 12/715*    (2013.01)
(Continued)

(52) U.S. Cl.
CPC .......... *H04L 41/04* (2013.01); *H04L 41/0893* (2013.01); *H04L 45/38* (2013.01);
(Continued)

(58) Field of Classification Search
CPC ..... H04L 41/04; H04L 45/38; H04L 41/0893; H04L 45/64; H04L 45/42; H04L 45/306
See application file for complete search history.

(56) References Cited

U.S. PATENT DOCUMENTS 9,602,352 B2 * 3/2017 Hallivuori ........... H04L 41/0853
2013/0044641 A1 * 2/2013 Koponen ................ H04L 12/66
370/255
(Continued)

FOREIGN PATENT DOCUMENTS

EP    2 804 344 A1    11/2014

OTHER PUBLICATIONS

International Search Report, dated Dec. 9, 2015, from corresponding PCT/FI2015/050265 application.

*Primary Examiner* — Hashim S Bhatti
(74) *Attorney, Agent, or Firm* — Young & Thompson

(57) ABSTRACT

A configuration system for configuring the control-plane of a software-defined network is presented. The configuration system determines an entity-specific group of control-plane functionalities for each of controller entities located in a distributed way in the software-defined network. The control-plane functionalities are suitable for configuring data forwarding network elements, such as routers, to support services to be provided by the software-defined network. The configuration system composes, on the basis of the entity-specific groups, entity-specific portions of control data and transmits the entity-specific portions of the control data to the controller entities so as to configure each controller entity to support the corresponding entity-specific group of the control-plane functionalities. Thus, the control-plane functionalities can be distributed between the controller entities in scalable way for example in accordance with requirements related to the control-plane functionalities and/or a spatial distribution of the needs for different ones of the control-plane functionalities.

19 Claims, 2 Drawing Sheets

(51) Int. Cl.
*H04L 12/717* (2013.01)
*H04L 12/721* (2013.01)
*H04L 12/725* (2013.01)

(52) U.S. Cl.
CPC ............. *H04L 45/42* (2013.01); *H04L 45/64* (2013.01); *H04L 45/306* (2013.01)

(56) References Cited

U.S. PATENT DOCUMENTS

| | | | | |
|---|---|---|---|---|
| 2013/0250770 A1* | 9/2013 | Zou | .......................... | H04L 47/19 370/238 |
| 2014/0112192 A1* | 4/2014 | Chou | .................... | H04L 41/042 370/254 |
| 2014/0307556 A1* | 10/2014 | Zhang | ................... | H04L 45/302 370/236 |

* cited by examiner

CONFIGURATION SYSTEM FOR CONFIGURING THE CONTROL-PLANE OF A SOFTWARE-DEFINED NETWORK

FIELD OF THE DISCLOSURE

The disclosure relates generally to software-defined networking. More particularly, the disclosure relates to the control-plane of a software-defined network "SDN". Furthermore, the disclosure relates to a configuration method and to a configuration system for configuring the control-plane of a software-defined network. Furthermore, the disclosure relates to a computer program for configuring the control-plane of a software-defined network.

BACKGROUND

Software-defined networking is an emerging architecture for data transfer networks. In a software-defined network "SDN", the control-plane is separated from the data-plane so that the control-plane is implemented in a controller system that can be separate from the data forwarding network elements and the data-plane is implemented in the data forwarding network elements. Typically, the software-defined networking allows for quick experimenting and optimization of switching and/or routing policies and external access to the innards of data forwarding network elements that formerly were closed and proprietary. The data forwarding network elements can be, for example, Internet Protocol "IP" routers, multiprotocol label switching "MPLS" nodes, packet optical switches, and/or Ethernet switches. Each data forwarding network element may consist of a single apparatus or a combination of a plurality of apparatuses. Furthermore, a data forwarding network element can be a software-implemented virtual machine "VM" running in a hardware that has other tasks too.

The controller system of a software-defined network "SDN" is adapted to configure the data forwarding network elements so that the data forwarding network elements are capable of operating as nodes of the software-defined network. When configuring a data forwarding network element, the controller system sends to the data forwarding network element configuration data with the aid of which the data forwarding network element constructs a data-plane system for forwarding and otherwise managing data. The data-plane system comprises typically one or more look-up tables with the aid of which the data forwarding network element is capable of operating as a part of the software-defined network. The data-plane system can be constructed and maintained in accordance with for example the OpenFlow protocol. Details about the OpenFlow can be found from the OpenFlow Switch Specification managed by the Open Networking Foundation "ONF".

The architecture of the controller system has evolved from the original centralized-controller architecture where the controller system is implemented with a single controller entity to a multi-controller architecture where the controller system is implemented with many controller entities that are located in a distributed way in the software-defined network, because the original centralized-controller architecture has its limits on the scalability and it is more vulnerable than the multi-controller architecture. Each controller entity may consist of a single apparatus or a combination of a plurality of apparatuses, or a controller entity can be a software-implemented virtual machine "VM" running in a hardware that has also one or more other tasks such as, for example but not necessarily, operating as a data forwarding network element. It is also possible that a same hardware is used for two or more functionally separate controller entities so that each of the controller entities is a software-implemented virtual machine.

The multi-controller architecture is, however, not free from challenges. One of the challenges is related to the requirement to ensure that the control-plane is implemented in the decentralized controller entities so that different ones of the controller entities do not, in any situation, deliver mutually conflicting configuration messages to the data forwarding network elements.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new configuration method for configuring the control-plane of a software-defined network "SDN". A configuration method according to the invention comprises:

determining entity-specific groups of control-plane functionalities, each of the entity-specific groups relating to a corresponding one of controller entities located in a distributed way in the software-defined network and each of the control-plane functionalities being suitable for configuring data forwarding network elements, e.g. routers, of the software-defined network to support at least a part of one or more applications suitable for supporting at least a part of one or more services to be provided by the software-defined network, composing, on the basis of the entity-specific groups of the control-plane functionalities, entity-specific portions of control data, each of the entity-specific portions of the control data being suitable for configuring the corresponding controller entity to support the corresponding entity-specific group of the control-plane functionalities, and transmitting the entity-specific portions of the control data to the controller entities so as to configure each of the controller entities to support the corresponding entity-specific group of the control-plane functionalities.

The control-plane can be distributed between the controller entities in scalable way for example in accordance with functionality-specific requirements related to the control-plane functionalities and/or the spatial distribution of the needs for different ones of the control-plane functionalities within the software-defined network. Furthermore, the distribution of the control-plane between the controller entities can be changed dynamically in accordance with monitored changes related to the operation of the software-defined network, e.g. changes in the spatial distribution of the needs for different ones of the control-plane functionalities and/or changes in the topology of the software-defined network. Each entity-specific group of the control-plane functionalities identifies one or more of the control-plane functionalities. Thus, the word "group" is to be understood in the broad sense so that a plurality of group members is not required. Furthermore, it is to be noted that the software-defined network may comprise controller entities which are not subject to the above-defined configuration method.

The distributing the control-plane does not significantly increase the risk of delivering mutually conflicting configuration messages to data forwarding network elements because the control-plane is distributed so that, as a main rule, different controller entities are configured to implement different data-plane functionalities into a given data forwarding network element. Due to possible reliability requirements it is, however, possible to configure one or more controller entities to be capable of configuring one or more same data-plane functionalities into a given data forwarding network element. In this case, where there is redundancy for protection purposes, conflicts between configuration messages relating to a same data-plane functionality and sourced by different controller entities can be avoided for example so that the controller entities have, concerning the data-plane functionality in question, a mutual priority order. Thus, the data forwarding network element can be adapted to use configuration messages sent by a lower priority controller entity for configuring the above-mentioned data-plane functionality only in a case where corresponding configuration messages related to a higher priority controller entity are absent.

Each of the above-mentioned data forwarding network elements can be, for example but not necessarily, an Internet Protocol "IP" router, a multiprotocol label switching "MPLS" switch, a packet optical switch, and/or an Ethernet switch.

In accordance with the invention, there is provided also a new a configuration system for configuring the control-plane of a software-defined network. A configuration system according to the invention comprises data transfer equipment for transmitting control data to controller entities located in a distributed way in the software-defined network and a processing system for:
- determining entity-specific groups of control-plane functionalities, each of the entity-specific groups relating to a corresponding one of the controller entities and each of the control-plane functionalities being suitable for configuring data forwarding network elements of the software-defined network to support at least a part of one or more applications suitable for supporting at least a part of one or more services to be provided by the software-defined network,
- composing, on the basis of the entity-specific groups of the control-plane functionalities, entity-specific portions of the control data, each of the entity-specific portions of the control data being suitable for configuring the corresponding controller entity to support the corresponding entity-specific group of the control-plane functionalities, and
- controlling the data transfer equipment to transmit the entity-specific portions of the control data to the controller entities so as to configure each of the controller entities to support the corresponding entity-specific group of the control-plane functionalities.

The configuration system can be for example a part of a network management system "NMS" of the software-defined network, or a part of some other network orchestrator which controls and operates the software-defined network. It is also possible that the configuration system is a part of a business management system of an operator of the software-defined network. Furthermore, the configuration system can be connected to a customer self-service provisioning portal or another user interface with the aid of which a user of the software-defined network is capable of ordering services, e.g. a specified data transfer capacity from one point to another, permanently or for a specified period of time.

In accordance with the invention, there is provided also a new computer program for configuring the control-plane of a software-defined network. A computer program according to the invention comprises computer executable instructions for controlling a programmable processing system to:
- determine entity-specific groups of control-plane functionalities, each of the entity-specific groups relating to a corresponding one of controller entities located in a distributed way in the software-defined network and each of the control-plane functionalities being suitable for configuring data forwarding network elements of the software-defined network to support at least a part of one or more applications suitable for supporting at least a part of one or more services to be provided by the software-defined network,
- compose, on the basis of the entity-specific groups of the control-plane functionalities, entity-specific portions of control data, each of the entity-specific portions of the control data being suitable for configuring the corresponding controller entity to support the corresponding entity-specific group of the control-plane functionalities, and
- control data transfer equipment to transmit the entity-specific portions of the control data to the controller entities so as to configure each of the controller entities to support the corresponding entity-specific group of the control-plane functionalities.

In accordance with the invention, there is provided also a new computer program product. The computer program product comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below with reference to the accompanying drawings, in which.

DESCRIPTION OF EXEMPLIFYING AND NON-LIMITING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
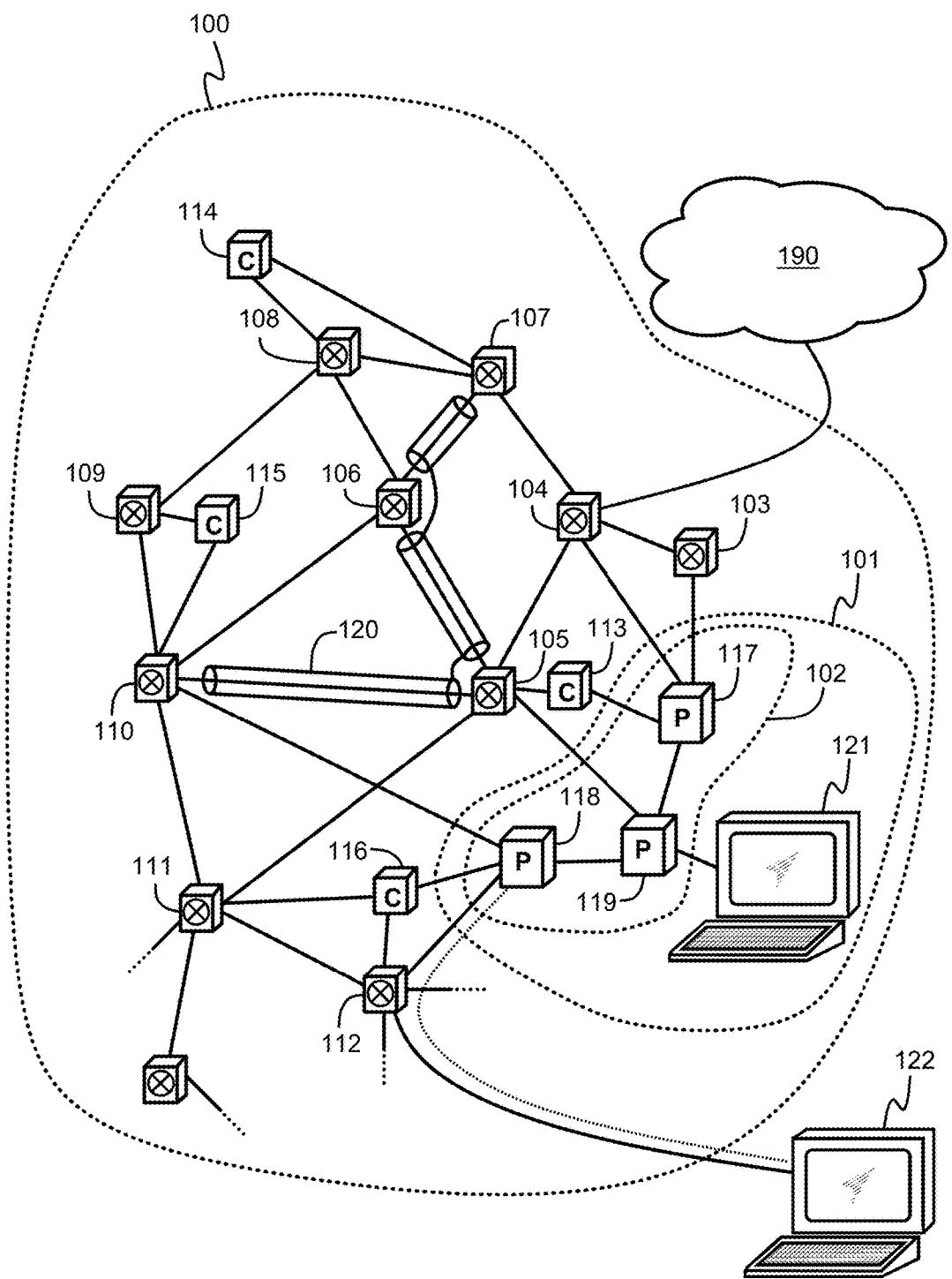
FIG. 1 shows a schematic illustration of an exemplifying software-defined network comprising a configuration system according to an exemplifying and non-limiting embodiment of the invention.

FIG. 1 shows a schematic illustration of an exemplifying software-defined network "SDN" 100. The software-defined network comprises data forwarding network elements 103, 104, 105, 106, 107, 108, 109, 110, 111, and 112. The data forwarding network elements 103-112 of this exemplifying software-defined network are mutually interconnected with data transfer links as illustrated in FIG. 1. Furthermore, the exemplifying software-defined network "SDN" 100 may comprise other data forwarding network elements that are not shown in FIG. 1. Each of the data forwarding network elements can be e.g. an Internet Protocol "IP" router, a multiprotocol label switching "MPLS" node, a packet optical switch, and/or an Ethernet switch. Each data forwarding network element may consist of a single apparatus or a combination of a plurality of apparatuses, or the data forwarding network element under consideration can be a software-implemented virtual machine "VM". The software-defined network 100 comprises controller entities 113, 114, 115, and 116 located in a distributed way within the software-defined network. Each of the controller entities 113-116 may consist of a single apparatus or a combination of a plurality of apparatuses, or the controller entity under consideration can be a software-implemented virtual machine "VM" running in a hardware that has also one or more other tasks such as, for example but not necessarily, operating as a data forwarding network element. For example, the controller entity 115 and the data forwarding network element 109 might the implemented with a same hardware. It is also possible that a same hardware is used for two or more functionally separate controller entities so that each of the controller entities is a software-implemented virtual machine. Furthermore, the software-defined network 100 may comprise other controller entities that are not shown in FIG. 1. In the software-defined network 100, the control-plane is implemented in the controller entities 113-116 and the data-plane is implemented in the data forwarding network elements 103-112.

The controller entities 113-116 are adapted to send configuration data to the data forwarding network elements 103-112 so as to enable each data forwarding network element to construct and maintain a data-plane system that enables the data forwarding network element to manage data frames in a desired manner. The data-plane system comprises typically a system of interconnected look-up tables for selecting software-defined actions to be carried out in different operational situations. The data frames to be managed can be for example Internet Protocol IP-packets, MPLS-labeled frames, Ethernet frames, or protocol data units "PDU" according to some other data transfer protocol. The controller entities 113-116 can be adapted to configure the data forwarding network elements 103-112 in accordance with e.g. the OpenFlow or some other suitable protocol for the software-defined networking.

In an exemplifying case where the OpenFlow is used, the data-plane system of a data forwarding network element comprises one or more flow tables and one or more group tables according to the OpenFlow specification. Each flow table contains a set of flow entries. Each flow entry may consist of match fields, counters, and a set of software-defined actions to apply to matching data frames. Matching typically starts at the first flow table and may continue to additional flow tables. Flow entries are typically arranged into a priority order and the first matching entry in each table is the one being used. If a matching flow entry is found, the one or more software-defined actions associated with this specific flow entry are executed. If no match is found in a flow table, the data frame under consideration may be forwarded to an appropriate one of the controller entities 113-116 over an Open-Flow channel between the network element and the controller entity under consideration, the data frame may be dropped, or the data frame may continue to the next flow table or to a group table. Software-defined actions associated with each flow entry may comprise for example data frame forwarding, data frame modification, group table processing, and pipeline processing. Pipeline processing actions allow data frames to be sent to subsequent flow tables for further processing and allow information, in the form of metadata, to be communicated between the flow tables. In conjunction with the Open Flow, the metadata is typically a bit vector having 64 bits. The pipeline processing stops when the one or more software-defined actions associated with a matching flow entry does not specify a next table. At this point the data frame under consideration is usually modified and forwarded. The group table processing actions allow data frames to be sent to a group table for further processing and allow information, in the form of metadata, to be communicated to the group table. The group table contains group entries, where each group entry may contain a list of software-defined actions to be executed in conjunction with data frames defined to belong to a particular group. Furthermore, the configuration data for constructing and maintaining the data-plane system may comprise one or more configuration programs each of which comprising one or more computer executable instructions defining a software-defined action or a chain of software-defined actions to be executed when managing data in the data forwarding network element under consideration. The software-defined action or the chain of software-defined actions defined by the configuration program may comprise for example: recording data into a memory, modifying the data, selecting one or more of egress ports of the data forwarding network element and forwarding the data and its possible duplicates to the selected one or more egress ports, selecting one or more look-up tables of the data-plane system of the network element and executing one or more look-ups from the selected look-up tables, performing arithmetic operations, branching operations, performing logical operations, reading metadata associated with the data being managed, writing metadata associated with the data, modifying metadata associated with the data, dropping the data, and/or duplicating the data.

The software-defined network 100 comprises a configuration system 101 for configuring the control-plane of the software-defined network 100. The configuration system 101 represents an upper hierarchy-level control arrangement than the controller entities 113-116 for running the control-plane. The configuration system can be for example a part of a network management system "NMS" of the software-defined network, or a part of some other network orchestrator which controls and operates the software-defined network. It is also possible that the configuration system is a part of a business management system of an operator of the software-defined network. Furthermore, the configuration system 101 can be connected to customer premises equipment 122 so as to provide a customer self-service provisioning portal or another user interface with the aid of which a user of the software-defined network is capable of ordering services, e.g. a specified data transfer capacity between specified points, permanently or for a specified period of time. The configuration system 101 comprises a processing system 102 for composing control data for configuring the controller entities 113-116 and data transfer equipment for transmitting the control data to the controller entities 113-116. The configuration system 101 may further comprise a user interface device 121 for allowing an operator to monitor and control the software-defined network 100. In the exemplifying case illustrated in FIG. 1, the processing system and the data transfer equipment are implemented in interconnected devices 117, 118, and 119 each comprising one or more egress ports, one or more ingress ports, and one or more processor circuits. Each processor circuit can be a programmable processor circuit provided with appropriate software, a dedicated hardware processor such as for example an application specific integrated circuit "ASIC", or a configurable hardware processor such as for example a field programmable gate array "FPGA". Furthermore, each of the devices 117-119 may comprise one or more memory circuits.

The processing system 102 is adapted to determine, for each of the controller entities 113-116, an entity-specific group of control-plane functionalities to be supported by the controller entity under consideration. Each of the control-plane functionalities is suitable for configuring the data forwarding network elements 103-112 to support at least a part of one or more applications suitable for supporting at least a part of one or more services to be provided by the software-defined network. The services may comprise for example a given data transfer capacity from one point of the software-defined network to another point, collecting statistics, encrypting and decrypting data to be transferred, and/or other services wanted by users of the software-defined network. The applications may comprise for example routing management, management of tunnels, traffic policing and/or shaping, Media Access Control "MAC" learning, and/or other applications that are needed for providing the desired services. The processing system 102 is adapted to compose entity-specific portions of control data on the basis of the above-mentioned entity-specific groups of the control-plane functionalities. Each of the entity-specific portions of the control data is suitable for configuring the corresponding controller entity to support the corresponding entity-specific group of the control-plane functionalities. The processing system 102 is adapted to control the data transfer equipment of the configuration system 101 to transmit the entity-specific portions of the control data to the controller entities 113-116 so as to configure each of the controller entities to support the corresponding entity-specific group of the control-plane functionalities. For example, the entity-specific portion of the control data addressed to the controller entity 113 may contain data for configuring the controller entity 113 to establish, maintain, and update routes in the software-defined network, i.e. to configure data-plane systems of the data forwarding network elements to be capable of forwarding data in a desired way. For another example, the entity-specific portion of the control data addressed to the controller entity 116 may contain data for configuring the controller entity 116 to establish, maintain, and tear down tunnels in the software-defined network. In FIG. 1, an exemplifying tunnel is denoted with a reference number 120. For a third example, each of the entity-specific portions of the control data may contain data for configuring the corresponding controller entity to control link and/or network element protections in a part of the software-defined network defined in the entity-specific portion of the control data under consideration. For a fourth example, each of the entity-specific portions of the control data may contain data for configuring the corresponding controller entity to control the MAC-learning in a part of the software-defined network defined in the entity-specific portion of the control data under consideration. In the above-mentioned examples, those of the control-plane functionalities which require fast responses, e.g. control-plane functionalities related to the protection, are implemented in many controller entities so as to keep these control-plane functionalities in the vicinity of the data forwarding network elements in order to achieve the required fast responses. Correspondingly, those of the control-plane functionalities which cause a significant amount of control traffic and/or high processing workload, e.g. control-plane functionalities related to the MAC-learning, are implemented in many controller entities advantageously in the vicinity of the data forwarding network elements so as to effectively handle the high workload and/or to keep the control traffic as local as possible. In many cases, it is advantageous or even necessary to allocate controller capacity that is closest to the data forwarding network elements for such control-plane functionalities where the response time is critical. On the other hand, control-plane functionalities which are not necessarily so time-critical but require a wider view of the software-defined network 100, e.g. control-plane functionalities related to the routing and tunneling, can be implemented in the one or more controller entities which may be located for example in a same data center as the configuration system 101. Control-plane functionalities related to for example the above-mentioned routing and tunneling and/or control-plane functionalities related to other applications can be distributed to two or more controller entities for example so that each of these controller entities is configured to support same one or more control-plane functionalities but different ones of these controller entities operate, concerning these control-plane functionalities, in different parts of the software-defined network 100. Furthermore, it is possible that there is/are one or more other control-plane functionalities each of which is supported by only one of the above-mentioned controller entities. Thus, in a general case, each of the control-plane functionalities can be supported by one or more controller entities.

In the software-defined network 100, the control-plane functionalities can be distributed between the decentralized controller entities 113-116 in accordance with many different principles, criteria, and requirements. The distribution of the control-plane functionalities is determined by forming the above-mentioned entity-specific groups of the control-plane functionalities which indicate the control-plane functionalities to be implemented in each of the controller entities. It is possible to use various optimization algorithms for finding out one or more ways to distribute the control-plane functionalities between the decentralized controller entities 113-116 so that requirements of the applications are fulfilled and furthermore the processing resources available in the controller entities are optimally utilized. In typical software-defined networks, the distribution of the data-plane functionalities between data forwarding network elements can be optimized concerning, among others, requirements and resources but, in the software-defined network 100 illustrated in FIG. 1, the distribution of the control-plane functionalities between the decentralized controller entities 113-116 can be optimized too. Furthermore, the distribution of the control-plane functionalities between the decentralized controller entities 113-116 can be dynamically changed in accordance with changes related to the operation of the software-defined network 100. It is to be noted that e.g. changes related to the topology of the software-defined network are also, at least indirectly, changes related to the operation of the software-defined network. Non-limiting example principles for distributing the control-plane functionalities between the decentralized controller entities 113-116 are described below.

In a configuration system according to an exemplifying and non-limiting embodiment of the invention, the processing system 102 is adapted to determine the above-mentioned entity-specific groups of the control-plane functionalities on the basis of at least the locations of the controller entities 113-116 within the software defined network 100 and demand distribution data indicative of the spatial distribution of needs for different ones of the control-plane functionalities within the software defined network.

In a configuration system according to an exemplifying and non-limiting embodiment of the invention, the processing system 102 is adapted to update one or more of the entity-specific groups of the control-plane functionalities in accordance with changes of the above-mentioned demand distribution data so as to dynamically adapt the distribution of the control-plane between the controller entities 113-116 in accordance with the changes of the spatial distribution of the needs for different ones of the control-plane functionalities. The dynamical adaptation of the distribution of the control-plane further comprises composing updated entity-specific portions of the control data on the basis of the updated entity-specific groups of the control-plane functionalities and controlling the data transfer equipment to transmit the updated entity-specific portions of the control data to the respective controller entities. The processing system 102 can be adapted to carry out the above-mentioned actions.

In a configuration system according to an exemplifying and non-limiting embodiment of the invention, the processing system 102 is adapted to determine the entity-specific groups of the control-plane functionalities on the basis of at least functionality-specific requirements related to the control-plane functionalities, e.g. a maximum allowed response time, and capabilities of the controller entities 113-116 of satisfying the functionality-specific requirements.

In a configuration system according to an exemplifying and non-limiting embodiment of the invention, the processing system 102 is adapted to update one or more of the entity-specific groups of the control-plane functionalities in accordance with changes of the above-mentioned functionality-specific requirements so as to dynamically adapt the distribution of the control-plane between the controller entities 113-116 in accordance with the changes of the functionality-specific requirements.

In a configuration system according to an exemplifying and non-limiting embodiment of the invention, the processing system 102 is adapted to determine the entity-specific groups of the control-plane functionalities on the basis of at least estimates of processing workloads related to the control-plane functionalities and processing capacities of the controller entities. The estimates of the processing workloads can be based on e.g. earlier measurements carried out in software-defined networks and/or on laboratory experiments.

In a configuration system according to an exemplifying and non-limiting embodiment of the invention, the processing system 102 is adapted to update one or more of the entity-specific groups of the control-plane functionalities in accordance with changes of the above-mentioned estimates of the processing workloads so as to dynamically adapt the distribution of the control-plane between the controller entities 113-116 in accordance with the changes of the estimates of the processing workloads.

It is to be noted that any combination of two or more of the above-presented principles are possible. For example, the entity-specific groups of the control-plane functionalities can be determined and updated in accordance with e.g. the spatial distribution of the needs for different ones of the control-plane functionalities and the functionality-specific requirements related to the control-plane functionalities.

It is worth noting that the above-presented principle where the distribution of the control-plane functionalities between the controller entities is determined with the aid of the entity-specific groups of the control-plane functionalities does not require any hierarchy or other predetermined organization between the controller entities. The distribution of the control-plane between two or more of the controller entities can be for example symmetric, i.e. non-hierarchical, so that:

a first one of the controller entities is capable of configuring, in accordance with its entity-specific group of the control-plane functionalities, each data forwarding network element that is configurable by a second one of the controller entities, and correspondingly the second one of the controller entities is capable of configuring, in accordance with its entity-specific group of the control-plane functionalities, each data forwarding network element that is configurable by the first one of the controller devices.

Figure 2:
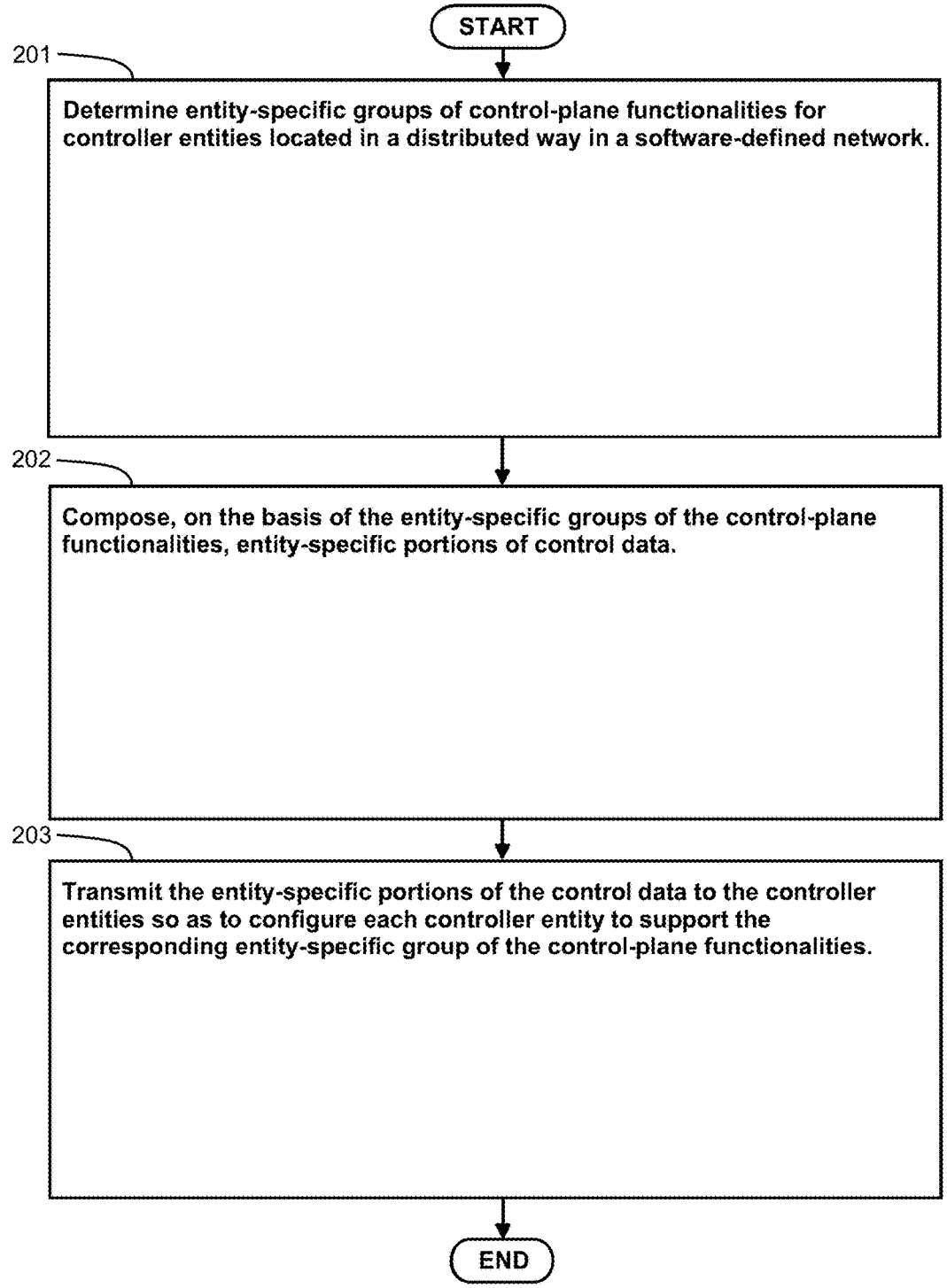
FIG. 2 shows a flowchart of a configuration method according to an exemplifying and non-limiting embodiment of the invention for configuring the control-plane of a software-defined network.

FIG. 2 shows a flowchart of a configuration method according to an exemplifying and non-limiting embodiment of the invention for configuring the control-plane of a software-defined network "SDN". The method comprises the following actions:

action 201: determining entity-specific groups of control-plane functionalities, each of the entity-specific groups relating to a corresponding one of controller entities located in a distributed way in the software-defined network and each of the control-plane functionalities being suitable for configuring data forwarding network elements of the software-defined network to support at least a part of one or more applications suitable for supporting at least a part of one or more services to be provided by the software-defined network, action 202: composing, on the basis of the entity-specific groups of the control-plane functionalities, entity-specific portions of control data, each of the entity-specific portions of the control data being suitable for configuring the corresponding controller entity to support the corresponding entity-specific group of the control-plane functionalities, and action 203: transmitting the entity-specific portions of the control data to the controller entities so as to configure each of the controller entities to support the corresponding entity-specific group of the control-plane functionalities.

A configuration method according to an exemplifying and non-limiting embodiment of the invention comprises updating one or more of the entity-specific groups of the control-plane functionalities in accordance with changes related to the operation of the software-defined network so as to dynamically adapt the distribution of the control-plane between the controller entities in accordance with the changes related to the operation of the software-defined network.

A configuration method according to an exemplifying and non-limiting embodiment of the invention comprises gathering, from the software-defined network, demand distribution data indicative of the spatial distribution of the needs for different ones of the control-plane functionalities within the software defined network. In this exemplifying configuration method, the entity-specific groups of the control-plane functionalities are determined on the basis of at least the locations of the controller entities within the software defined network and the above-mentioned demand distribution data.

A configuration method according to an exemplifying and non-limiting embodiment of the invention comprises repeating the above-mentioned gathering the demand distribution data during the operation of the software defined network and updating one or more of the entity-specific groups of the control-plane functionalities in accordance with changes of the above-mentioned demand distribution data so as to dynamically adapt the distribution of the control-plane between the controller entities in accordance with the changes of the spatial distribution of the needs for different ones of the control-plane functionalities.

In a configuration method according to an exemplifying and non-limiting embodiment of the invention, the entity-specific groups of the control-plane functionalities are determined on the basis of at least functionality-specific requirements related to the control-plane functionalities and capabilities of the controller entities of satisfying the functionality-specific requirements.

A configuration method according to an exemplifying and non-limiting embodiment of the invention comprises updating one or more of the entity-specific groups of the control-plane functionalities in accordance with changes of the above-mentioned functionality-specific requirements so as to dynamically adapt the distribution of the control-plane between the controller entities in accordance with the changes of the functionality-specific requirements.

In a configuration method according to an exemplifying and non-limiting embodiment of the invention, the entity-specific groups of the control-plane functionalities are determined on the basis of at least estimates of processing workloads related to the control-plane functionalities and processing capacities of the controller entities.

A configuration method according to an exemplifying and non-limiting embodiment of the invention comprises updating one or more of the entity-specific groups of the control-plane functionalities in accordance with changes of the above-mentioned estimates of the processing workloads so as to dynamically adapt the distribution of the control-plane between the controller entities in accordance with the changes of the estimates of the processing workloads.

A configuration method according to an exemplifying and non-limiting embodiment of the invention provides a symmetric, i.e. non-hierarchical, mutual relationship between two or more of the controller entities so that the configuration method comprises:
configuring a first one of the controller entities to be capable of configuring, in accordance with its entity-specific group of the control-plane functionalities, each data forwarding network element that is configurable by a second one of the controller entities, and correspondingly
configuring the second one of the controller entities to be capable of configuring, in accordance with its entity-specific group of the control-plane functionalities, each data forwarding network element that is configurable by the first one of the controller devices.

A computer program according to an exemplifying and non-limiting embodiment of the invention comprises computer executable instructions for controlling a programmable processing system to carry out actions related to a method according to any of the above-described exemplifying and non-limiting embodiments of the invention.

A computer program according to an exemplifying and non-limiting embodiment of the invention comprises software modules for configuring the control-plane of a software-defined network "SDN". The software modules comprise computer executable instructions for controlling a programmable processing system to:
determine entity-specific groups of control-plane functionalities, each of the entity-specific groups relating to a corresponding one of controller entities located in a distributed way in the software-defined network and each of the control-plane functionalities being suitable for configuring data forwarding network elements of the software-defined network to support at least a part of one or more applications suitable for supporting at least a part of one or more services to be provided by the software-defined network,
compose, on the basis of the entity-specific groups of the control-plane functionalities, entity-specific portions of control data, each of the entity-specific portions of the control data being suitable for configuring the corresponding controller entity to support the corresponding entity-specific group of the control-plane functionalities, and
control data transfer equipment to transmit the entity-specific portions of the control data to the controller entities so as to configure each of the controller entities to support the corresponding entity-specific group of the control-plane functionalities.

The software modules can be e.g. subroutines or functions implemented with a suitable programming language and with a compiler suitable for the programming language and for the programmable processing system under consideration. It is worth noting that also a source code corresponding to a suitable programming language represents the computer executable software modules because the source code contains the information needed for controlling the programmable processing system to carry out the above-presented actions and compiling changes only the format of the information. Furthermore, it is also possible that the programmable processing system is provided with an interpreter so that a source code implemented with a suitable programming language does not need to be compiled prior to running.

A computer program product according to an exemplifying and non-limiting embodiment of the invention comprises a computer readable medium, e.g. a compact disc "CD", encoded with a computer program according to an exemplifying embodiment of invention.

A signal according to an exemplifying and non-limiting embodiment of the invention is encoded to carry information defining a computer program according to an exemplifying embodiment of invention.

The specific examples provided in the description given above should not be construed as limiting the scope and/or the applicability of the appended claims. List and groups of examples provided in the description given above are not exhaustive unless otherwise explicitly stated.

What is claimed is:
1. A configuration system for configuring a control-plane of a software-defined network, the configuration system comprising:
data transfer equipment for transmitting control data to controller entities located in a distributed way in the software-defined network,
wherein the configuration system further comprises a processing system for:

determining entity-specific groups of control-plane functionalities, each of the entity-specific groups relating to a corresponding one of the controller entities and each of the control-plane functionalities being suitable for configuring data forwarding network elements of the software-defined network to support at least a part of one or more applications suitable for supporting at least a part of one or more services to be provided by the software-defined network, composing, on the basis of the entity-specific groups of the control-plane functionalities, entity-specific portions of the control data, each of the entity-specific portions of the control data being suitable for configuring the corresponding controller entity to support the corresponding entity-specific group of the control-plane functionalities, and controlling the data transfer equipment to transmit the entity-specific portions of the control data to the controller entities so as to configure each of the controller entities to support the corresponding entity-specific group of the control-plane functionalities and wherein the processing system is adapted to determine the entity-specific groups of the control-plane functionalities on the basis of at least locations of the controller entities within the software defined network and demand distribution data indicative of a spatial distribution of needs for different ones of the control-plane functionalities within the software defined network.

2. The configuration system according to claim 1, wherein the processing system is adapted to update one or more of the entity-specific groups of the control-plane functionalities in accordance with changes related to operation of the software-defined network so as to dynamically adapt the distribution of the control-plane between the controller entities in accordance with the changes related to the operation of the software-defined network.

3. The configuration system according to claim 1, wherein the processing system is adapted to update one or more of the entity-specific groups of the control-plane functionalities in accordance with changes of the demand distribution data so as to dynamically adapt the distribution of the control-plane between the controller entities in accordance with changes of the spatial distribution of the needs for different ones of the control-plane functionalities within the software defined network.

4. The configuration system according to claim 1, wherein the processing system is adapted to determine the entity-specific groups of the control-plane functionalities on the basis of at least functionality-specific requirements related to the control-plane functionalities and capabilities of the controller entities of satisfying the functionality-specific requirements.

5. The configuration system according to claim 4, wherein the processing system is adapted to update one or more of the entity-specific groups of the control-plane functionalities in accordance with changes of the functionality-specific requirements so as to dynamically adapt the distribution of the control-plane between the controller entities in accordance with the changes of the functionality-specific requirements.

6. The configuration system according to claim 1, wherein the processing system is adapted to determine the entity-specific groups of the control-plane functionalities on the basis of at least estimates of processing workloads related to the control-plane functionalities and processing capacities of the controller entities.

7. The configuration system according claim 6, wherein the processing system is adapted to update one or more of the entity-specific groups of the control-plane functionalities in accordance with changes of the estimates of the processing workloads so as to dynamically adapt the distribution of the control-plane between the controller entities in accordance with the changes of the estimates of the processing workloads.

8. The configuration system according to claim 1, wherein the processing system is adapted to:
configure a first one of the controller entities to be capable of configuring, in accordance with its entity-specific group of the control-plane functionalities, each data forwarding network element that is configurable by a second one of the controller entities, and
configure the second one of the controller entities to be capable of configuring, in accordance with its entity-specific group of the control-plane functionalities, each data forwarding network element that is configurable by the first one of the controller devices.

9. The configuration system according to claim 1, wherein the configuration system is a part of a network management system of the software-defined network.

10. A configuration method for configuring a control-plane of a software-defined network, the configuration method comprising:
determining entity-specific groups of control-plane functionalities, each of the entity-specific groups relating to a corresponding one of controller entities located in a distributed way in the software-defined network and each of the control-plane functionalities being suitable for configuring data forwarding network elements of the software-defined network to support at least a part of one or more applications suitable for supporting at least a part of one or more services to be provided by the software-defined network,
composing, on the basis of the entity-specific groups of the control-plane functionalities, entity-specific portions of control data, each of the entity-specific portions of the control data being suitable for configuring the corresponding controller entity to support the corresponding entity-specific group of the control-plane functionalities,
transmitting the entity-specific portions of the control data to the controller entities so as to configure each of the controller entities to support the corresponding entity-specific group of the control-plane functionalities, and
gathering, from the software-defined network, demand distribution data indicative of a spatial distribution of needs for different ones of the control-plane functionalities within the software defined network, and wherein the entity-specific groups of the control-plane functionalities are determined on the basis of at least locations of the controller entities within the software defined network and the demand distribution data.

11. The configuration method according to claim 10, wherein the configuration method comprises updating one or more of the entity-specific groups of the control-plane functionalities in accordance with changes related to operation of the software-defined network so as to dynamically adapt the distribution of the control-plane between the controller entities in accordance with the changes related to the operation of the software-defined network.

12. The configuration method according to claim 10 wherein the configuration method comprises repeating the gathering the demand distribution data during operation of the software defined network and updating one or more of the entity-specific groups of the control-plane functionalities in accordance with changes of the demand distribution data so as to dynamically adapt the distribution of the control-plane between the controller entities in accordance with changes of the spatial distribution of the needs for different ones of the control-plane functionalities within the software defined network.

13. The configuration method according to claim 10, wherein the entity-specific groups of the control-plane functionalities are determined on the basis of at least functionality-specific requirements related to the control-plane functionalities and capabilities of the controller entities of satisfying the functionality-specific requirements.

14. The configuration method according to claim 13, wherein the configuration method comprises updating one or more of the entity-specific groups of the control-plane functionalities in accordance with changes of the functionality-specific requirements so as to dynamically adapt the distribution of the control-plane between the controller entities in accordance with the changes of the functionality-specific requirements.

15. The configuration method according to claim 10, wherein the entity-specific groups of the control-plane functionalities are determined on the basis of at least estimates of processing workloads related to the control-plane functionalities and processing capacities of the controller entities.

16. The configuration method according claim 15, wherein the configuration method comprises updating one or more of the entity-specific groups of the control-plane functionalities in accordance with changes of the estimates of the processing workloads so as to dynamically adapt the distribution of the control-plane between the controller entities in accordance with the changes of the estimates of the processing workloads.

17. The configuration method according to claim 10, wherein the configuration method comprises:
configuring a first one of the controller entities to be capable of configuring, in accordance with its entity-specific group of the control-plane functionalities, each data forwarding network element that is configurable by a second one of the controller entities, and
configuring the second one of the controller entities to be capable of configuring, in accordance with its entity-specific group of the control-plane functionalities, each data forwarding network element that is configurable by the first one of the controller devices.

18. A non-transitory computer readable medium encoded with a computer program for configuring a control-plane of a software-defined network, the computer program comprising computer executable instructions for controlling a programmable processing system to:
determine entity-specific groups of control-plane functionalities, each of the entity-specific groups relating to a corresponding one of controller entities located in a distributed way in the software-defined network and each of the control-plane functionalities being suitable for configuring data forwarding network elements of the software-defined network to support at least a part of one or more applications suitable for supporting at least a part of one or more services to be provided by the software-defined network,
compose, on the basis of the entity-specific groups of the control-plane functionalities, entity-specific portions of control data, each of the entity-specific portions of the control data being suitable for configuring the corresponding controller entity to support the corresponding entity-specific group of the control-plane functionalities, and
control data transfer equipment to transmit the entity-specific portions of the control data to the controller entities so as to configure each of the controller entities to support the corresponding entity-specific group of the control-plane functionalities;
wherein the processing system is adapted to determine the entity-specific groups of the control-plane functionalities on the basis of at least locations of the controller entities within the software defined network and demand distribution data indicative of a spatial distribution of needs for different ones of the control-plane functionalities within the software defined network.

19. The non-transitory computer readable medium according to claim 18, wherein the processing system is adapted to update one or more of the entity-specific groups of the control-plane functionalities in accordance with changes of the demand distribution data so as to dynamically adapt the distribution of the control-plane between the controller entities in accordance with changes of the spatial distribution of the needs for different ones of the control-plane functionalities within the software defined network.

* * * * *